(12) United States Patent
Vera et al.

(10) Patent No.: US 6,198,602 B1
(45) Date of Patent: Mar. 6, 2001

(54) SPLIT RING ATTACHMENT OF A HEAD GIMBAL ASSEMBLY TO AN ACTUATOR

(75) Inventors: Daniel Vera, Diamond Bar; Warren Coon, Temecula, both of CA (US)

(73) Assignee: Magnecomp Corp., Temecula, CA (US)

( * ) Notice: Subject to any disclaimer, the term of this patent is extended or adjusted under 35 U.S.C. 154(b) by 0 days.

(21) Appl. No.: 09/311,679

(22) Filed: May 12, 1999

Related U.S. Application Data

(60) Provisional application No. 60/131,160, filed on Apr. 26, 1999.

(51) Int. Cl.[7] ................................. G11B 21/16; G11B 5/48
(52) U.S. Cl. ............................................................ 360/244.5
(58) Field of Search ............................. 360/244.5, 244.6, 360/266.1

(56) References Cited

U.S. PATENT DOCUMENTS

| | | | |
|---|---|---|---|
| 4,912,583 | * | 3/1990 | Hinlein .................................. 360/104 |
| 4,991,045 | * | 2/1991 | Oberg .................................. 360/104 |
| 5,185,683 | * | 2/1993 | Oberg et al. ......................... 360/104 |
| 5,717,545 | * | 2/1998 | Brooks, Jr. et al. ................. 360/104 |
| 5,731,932 | * | 3/1998 | Crane .................................. 360/104 |
| 5,946,164 | * | 8/1999 | Tracy .................................. 360/104 |
| 6,038,103 | * | 3/2000 | Boutaghou et al. ................. 360/104 |
| 6,078,469 | * | 6/2000 | Girard .................................. 360/104 |

FOREIGN PATENT DOCUMENTS

| | | | |
|---|---|---|---|
| 6-259907 | * | 9/1994 | (JP) . |
| 8-087841 | * | 4/1996 | (JP) . |

* cited by examiner

*Primary Examiner*—William Klimowicz
(74) *Attorney, Agent, or Firm*—Louis J. Bachand

(57) ABSTRACT

A load beam is mounted in a head stack assembly without staking operations by mounting a mounting plate having an annular boss and carrying the load beam to an actuator arm having a circular opening by having the plate annular boss larger than the circular opening and providing for interfittment by having a split ring structure including a slot of an original width on the annular boss or the circular opening that deflects during mounting and thereafter resiliently retains the plate and arm together by the tendency of the slot to return to its original width.

11 Claims, 3 Drawing Sheets

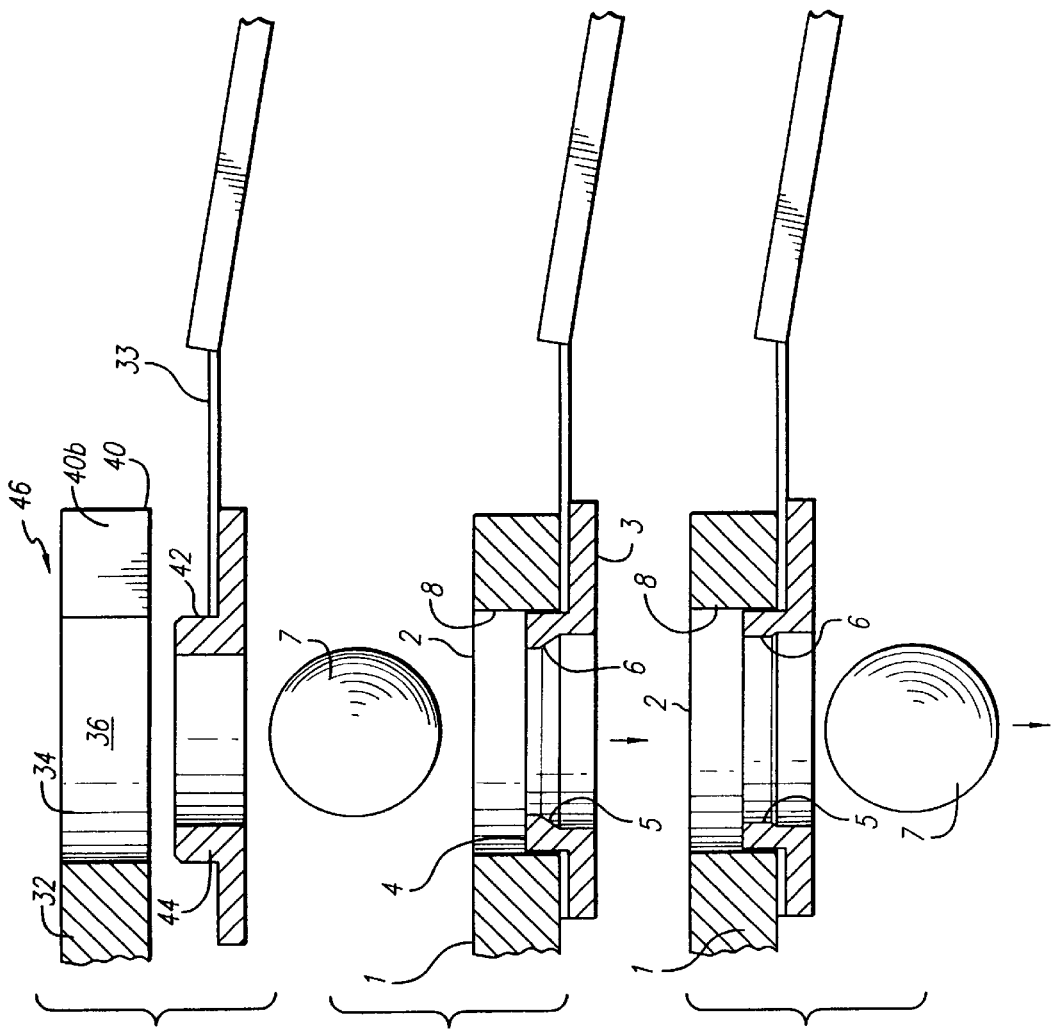

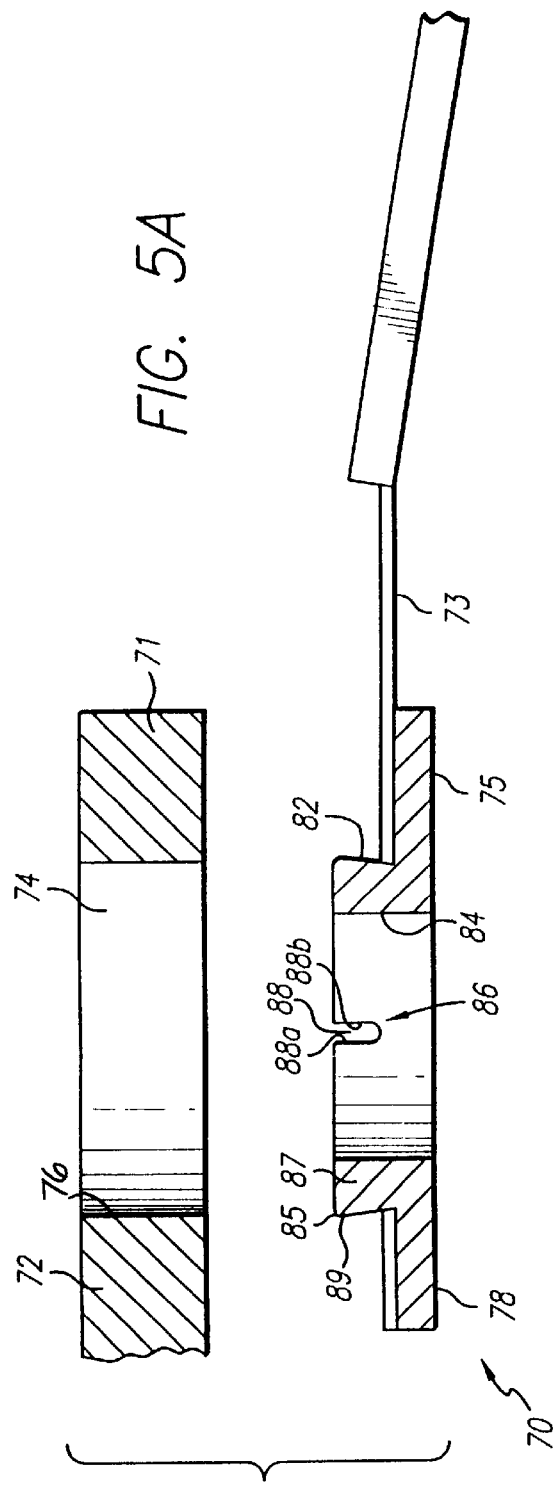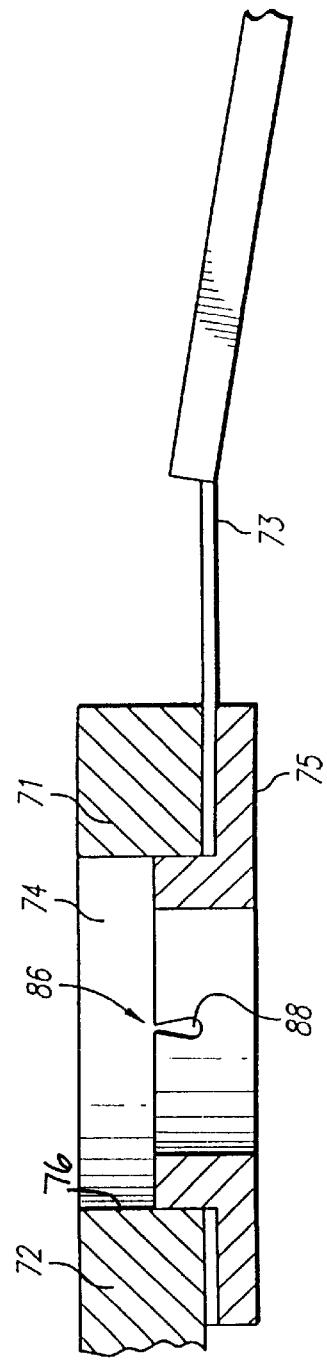

SPLIT RING ATTACHMENT OF A HEAD GIMBAL ASSEMBLY TO AN ACTUATOR

REFERENCE TO RELATED APPLICATION

This application claims the benefit of the United States Provisional Application serial no. 60/131,160, filed Apr. 26, 1999.

BACKGROUND OF THE INVENTION

1. Field of the Invention

This invention relates to disk drive suspensions and, more particularly, to components for disk drive suspensions. In disk drive suspensions, the load beam that carries the slider adjacent the disk is supported in cantilevered relation from an actuator arm that is shifted to correspondingly move the slider by way of the load beam. The load beam is attached to a mount plate that comprises a base and a boss and the mount plate is then attached to the actuator arm, frequently by staking the mounting plate boss to an opening in the actuator arm.

The invention replaces the usual staking method of attachment with split ring techniques that offers numerous advantages.

2. Related Art

Patents on mounting load beams to actuators include U.S. Pat. Nos. 4,829,395, 5,172,286, and 5,187,626. In these and similar devices the mounting plate annular boss is deliberately made undersized relative to the mating circular opening in the actuator arm but of a malleable metal so that the boss can be expanded to a friction fit with the surrounding arm opening. The arm may be one or a series of arms formed from a machined casting (i.e. an actuator arm or an E-block) to which one or more head gimbal assemblies (HGAs) are to be attached by staking or swaging. The resulting assembly is a head stack assembly (HSA). As shown in U.S. Pat. No. 4,829,395, a ball, or two, each progressively oversized relative to the inside diameter of the boss is passed through each boss within a surrounding arm opening aligned in a stack and by staking or swaging the boss outward make an interference fit between the HGA boss ODs and the ID of the hole in the actuator. With reference to FIG. 6A PRIOR ART the actuator arm 1 has a circular opening 2 of a predetermined diameter. Mount plate 3 has an annular boss 4 that is smaller in diameter than opening 2 and easily fits into the opening. Boss 4 has a bore 5 of a predetermined ID selected, as is the metal used, to permit deformation of the boss wall 6 into the surrounding opening 2. Ball 7 has diameter smaller than the opening 2 but larger than the ID of the boss bore 5. When forced through the bore 5 the ball 7 forces the boss wall radially into the inner wall 8 of the opening 2 to stake the mount plate 3 to the arm 1. See FIG. 6B, PRIOR ART.

The known method of staking the HGAs inevitably results in deformation of the mount plate. The deformation results in variations in the gram load (preload) applied by the suspension to the slider both as a function of staking direction or orientation (up facing as opposed to down facing) and also randomly due to part dimensional variation. Attempts to improve this usually trade off cost, by making the parts more precise or other performance parameters. For example, the gram load change can be reduced (improved) by making a less rugged attachment, trading torque resistance for gram change.

The industry trend is, however, toward allowing ever smaller tolerances on gram load variation while simultaneously seeking ever lower cost of each piece part and assembly. Variation in gram load is to be minimized as a cost-increasing factor to the disk drive. A common practice to overcome the variation in gram load is to make an adjustment to the stack by "tweaking" the suspension after the staking step takes place. This involves extra labor and thus cost and impacts yields of the assemblies as well again increasing costs.

When an HGA has the gram load changed from the original value, the target optimization of the suspension is lost. Such optimization is a key step in the suspension fabrication process whereby the mandrel that forms the preload on the suspension is adjusted for radius and location in such a way that the harmful resonances of the suspension are minimized. Typically, this part of the fabrication set-up may take several days to accomplish, and once done is kept until the set up is broken done to make something else on that assembly line. When the suspension is adjusted from the original value in gram load without the requisite precision, including the evaluation of the resonance effects, the optimization is lost and the suspension may induce resonances in the HAS or the disk drive. In the worst case, this could result in an inoperable drive assembly that would fail before it left the disk drive manufacturer.

SUMMARY OF THE INVENTION

The industry trend is to thinner baseplate flanges, that offer the prospect of a decrease in the mass that must be accelerated when the disk drive undergoes a "seek", that is in is moving from one track location radius to another. The ability of the HSA to accelerate from one track to another is proportional to its moment of inertia, which in turn depends on the mass being accelerated and the distance of that mass from the rotation center (the actuator bearing centerline). A thinner baseplate will, however, not be as rigid as a thicker one (by the cube of the ratio of thicknesses) and will be more easily deformed in staking operations, thus again raising the variance in gram load problems noted above.

It is an object, therefore, of the present invention to provide an alternative method of HGA attachment to the actuator in the stack build. It is a further object to provide a mounting plate-actuator arm assembly, incorporating the load beam, using a mounting plate boss larger, not smaller, than the arm circular opening, and assembling the mounting plate and arm together not by swaging or staking, but by the use of a split ring structure. The split ring structure, incorporated into the annular boss or the boss-receiving arm opening allows the interfittment of putatively noninterfitting parts by expanding or contracting depending on whether the split ring is inside or outside the assembly, and preserves their angular orientation by resiliently urging the parts into engagement as a function of the split ring slot tending to return to its preassembly larger or smaller width. It is a further object to provide a lead chamfer of the boss to facilitate insertion, and to provide a camming shoulder on the boss to increase radial forces in the assembled device.

These and other objects of the invention to become apparent, hereinafter, are realized in an assembly comprising a mounting plate having an annular boss of a predetermined outside diameter, an actuator having a circular opening of a predetermined inside diameter smaller than the boss outside diameter, at least one of the annular boss and the circular opening having a through slot allowing respectively contraction of the boss to less than actuator the circular opening or expansion of the actuator circular opening to greater than the boss outside diameter to permit their interfittment, the mounting plate boss and the actuator opening being interfitted, and a load beam attached to the mounting plate between the mounting plate and the actuator in their interfitted condition.

In this and like embodiments, typically, the boss comprises an annular wall, the through slot being formed in the boss annular wall to have its long axis parallel with the axis of revolution of the boss annular wall to facilitate compression of the boss annular wall to a diameter that interfits with the actuator circular opening, or the actuator comprises an arm defining a wall surrounding the circular opening, the through slot being formed in the wall and arm to have its long axis perpendicular to the axis of revolution of the opening surrounding wall to facilitate expansion of the circular opening to a diameter that fits over the annular boss.

In either of the foregoing embodiments, typically, the mounting plate is formed of full hard stainless steel having an Rc of 40–45, the through slot is about 0.005 inch in width and sufficiently deep to extend through the annular boss wall boss or the actuator circular opening wall, and the annular boss is champfered about its outer upper edge to facilitate entry of the boss into the circular opening.

In a specific form useful for the many presently contemplated HSAs, the mounting plate has a base about 0.2 inch square and about 0.010 inch or less deep and a central annular boss extending about 0.012 inch in height from the mounting plate base, the boss having an outside diameter of about 0.1075 inch, the actuator comprises an arm having a distal end with a thickness of about 0.03 inch, the actuator circular opening having an inside diameter of about 0.1050 inch and smaller than the boss outside diameter, the actuator opening extending through the arm distal end, the through slot extending through the arm distal end between the actuator circular opening and the arm distal end and having a width of about 0.005 inch.

In this and like embodiments, typically, the actuator comprises an arm defining a wall surrounding the circular opening, the axis of revolution of the actuator opening wall being located about 0.085 inch from the arm distal end.

In a further specific form, the mounting plate has a base about 0.2 inch square and about 0.010 inch or less deep and a central annular boss comprising an annular wall extending about 0.012 inch in height from the mounting plate base, the boss having an outside diameter of about 0.1075 inch, the actuator comprises an arm having a distal end with a thickness of about 0.03 inch, the actuator arm defining a wall surrounding the circular opening, the circular opening having an inside diameter of about 0.1050 inch and smaller than the boss outside diameter, the actuator opening extending through the arm distal end, the through slot extending through the boss annular wall for substantially the height of the annular boss wall, the through slot having a width of about 0.005 inch.

In this and like embodiments, too, the axis of revolution of the actuator circular opening wall is located about 0.085 inch from the arm distal end.

Other features of the invention include the boss annular wall being generally cylindrical and having a thickness of not less than about 0.020 inch, the slot having opposed faces spaced by the slot width, the boss annular wall having at its distal end an outwardly projecting shoulder sized to compress the slot to less than its initial width in the assembled condition of the actuator and mounting plate thereby to increase the radial forces therebetween, the annular boss having first and second parallel slots opposed across the diameter of the annular boss, each of the first and second slots having opposed faces spaced by the width of the slots, and the boss having a camming shoulder for urging the first and second slots to less than their initial width in the assembled condition of the actuator and mounting plate thereby to increase the radial forces therebetween.

In a further embodiment, the invention provides in a disk drive suspension actuator arm and mounting plate assembly in which the mounting plate has an annular boss and mounts a load beam and the actuator arm has a circular opening, the improvement comprising the annular boss diameter exceeding the actuator arm circular opening diameter, at least one of the annular boss and circular opening comprising a split ring structure enabling insertion of the annular boss into the circular opening and retention therein under tension or compressive forces generated by the split ring structure.

In its method aspects the invention provides the method of assembly of a mounting plate having an annular boss and carrying a load beam in fixed relation and an actuator arm having a circular opening smaller than and congruent with the boss, including defining a slot having an original width in the annular boss or the circular opening boss, inserting the annular boss into the circular opening, expanding or contracting the slot to accommodate the insertion step, and maintaining the annular boss within the circular opening through the force generated by the slot tending to return to its the original width.

BRIEF DESCRIPTION OF THE DRAWINGS

The invention will be further describe in conjunction with the attached drawing in which:

FIG. 4 is a view in vertical section taken on line 4—4 in FIG. 1;

FIGS. 5A and 5B are views in vertical section of a further embodiment of the invention; and FIGS. 6A and 6B are views of the PRIOR ART before and after staking with a ball, respectively.

DETAILED DESCRIPTION

As noted above, the invention dispenses with conventional staking techniques to join together in an assembly a mount plate and an actuator arm. Reliance is placed on a split ring to achieve insertion in the first instance and radial tension or compression in the second in making an effective HSA.

In the preferred embodiment, described in more detail below, the actuator arm circular opening has a 0.005 inch through slot cut in it its full height. This slot allows the actuator circular opening diameter to expand slightly, allowing a cylindrical boss of the mount plate to be inserted into the hole by simply a press fit. This press fit replaces ball staking. The annular boss is preferably specially adapted for press fitting with a lead or chamfer at the distal end of the cylinder, The slot structure, the actuator arm circular opening diameter, and the mount plate annular boss are absolutely and relatively sized so that the actuator circular opening will expand from its starting original or initial diameter to the boss diameter in elastic deformation only. Thus, the arm circular opening will return (contract) to its original size if the wedging effect of mount plate annular boss is removed. The annular boss will enter the unexpanded original sized actuator circular opening with the assistance of a lead or chamfer that forces the opening to enlarge elastically so that the cylinder walls of the opening can close upon the annular boss and being resilient hold it firmly without deforming it.

This and other embodiments of the invention offer these advantages:

1) The mount plate, including the annular boss, can be made of harder, stronger material (for example, full hard type 302/304 stainless steel (SST) with a hardness of Rc 40–45 and yield strength of 175–195 KPSI). With staking, it was typically necessary to use softer metal (only ¼ hard 302/304 SST with a hardness of Rc 25–30 and yield strength of 90–120 KPSI) because the metal had to be deformable to be staked into position;

2) The now possible use of the harder material makes the mount plate more resistant to undesirable deformations, and, therefore, less susceptible to gram load change due to deformation as discussed above;

3) The harder material is more rigid, and enhances performance of its function as a rigid support for the load beam to act from;

4) The invention assembly and method permit the use of a thread-sealing type of adhesive to the interfacing surfaces between the boss and the mating hole to enhance the torque resistance of the mount plate; and 5) Rework is easier than before since the slot may be pried apart to release the mount plate (if done before adhesive is applied) and the actuator boss is relatively undamaged compared to the prior art staked case.

Figure 1:
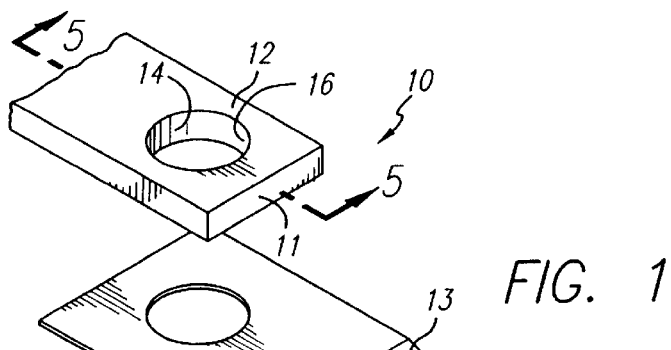
FIG. 1 is an exploded, oblique view of one embodiment of the invention assembly, the mount plate annular boss having the split ring structure.

With reference now to the drawings in detail, in FIG. 1 the invention assembly is shown at 10 and comprises an actuator arm 12 having at its distal end 11 a circular opening 14 having a cylindrical wall 16 of a predetermined diameter. The assembly 10 further comprises a mount plate 18 having an annular boss 22 formed of wall 24. Load beam 13 is fixed to the mount plate base 15 by welding or the like. Boss 22 is greater in diameter than the circular opening 14. A split ring structure 26 is provided in the boss 22 as shown including through slot 28 having opposing faces 28a, 28b, the slot being adapted to be compressed to a lesser than initial width by the entry of the boss into the circular opening 14, effecting a contraction of the boss 22, Cf. FIG. 5.

Figure 2:
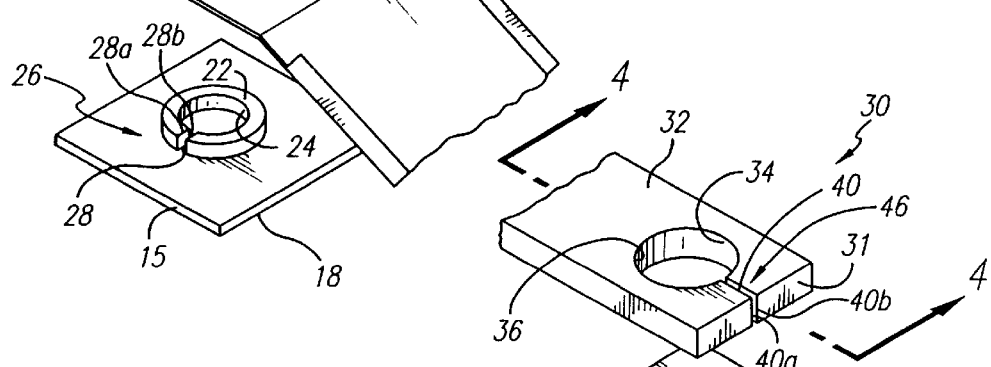
FIG. 2 is a view like FIG. 1 of a second embodiment of the invention, the actuator arm circular opening having the split ring structure.

In FIGS. 2 and 4 an alternate form of the invention assembly is shown at 30. Assembly 30 comprises an actuator arm 32 having at its distal end 31 a circular opening 34 having a cylindrical wall 36 of a predetermined diameter. The assembly 30 further comprises a mount plate 38 having an annular boss 42 formed of wall 44. Load beam 33 is fixed to the mount plate base 35 by welding or the like. Boss 42 is greater in diameter than the circular opening 34. A split ring structure 46 is provided in the distal end 31 of the actuator arm 32 as shown including a through slot 40 having opposing faces 40a, 40b, the slot being adapted to be expanded to a greater than initial width by the entry of the boss 42 into the circular opening 34, effecting an expansion of the diameter of the opening.

Figure 3:
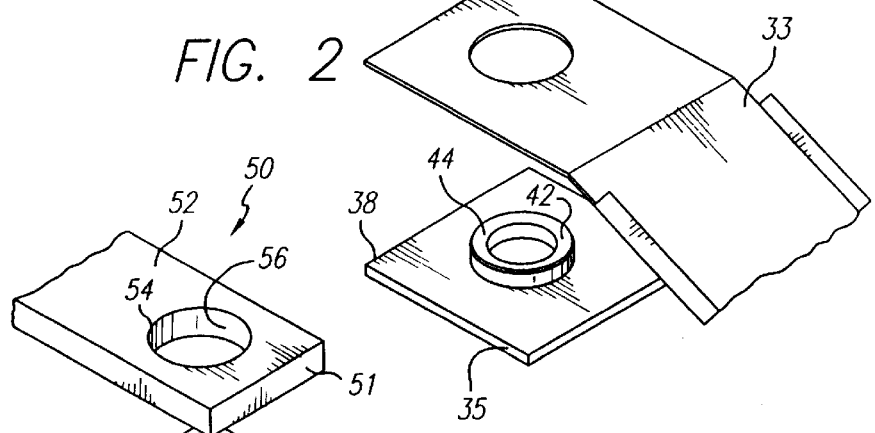
FIG. 3 is a view like FIG. 1, of a third embodiment of the invention, the mount plate annular boss having a double split ring structure.

In FIG. 3 an alternate form of the invention assembly is shown at 50. Assembly 50 comprises an actuator arm 52 having at its distal end 51 a circular opening 54 having a cylindrical wall 56 of a predetermined diameter. The assembly 50 further comprises a mount plate 58 having an annular boss 62. Load beam 53 is fixed to the mount plate base 55 by welding or the like. Boss 62 is greater in diameter than the circular opening 54. A double split ring structure 56a, 56b is provided in the boss 62 as shown including through slots 58, 59 having opposing faces 58a, 58b, and 59a, 59b, respectively. Slots 58, 59 are adapted to be compressed to a lesser than initial width by the entry of the boss 62 into the circular opening 54, effecting a contraction of the boss 62. Cf. FIG. 5.

In FIGS. 5A and 5B, an alternate form of the invention assembly is shown at 70. Assembly 70 is like the embodiment of FIG. 1 or FIG. 3 in having an actuator arm 72 having at its distal end 71 a circular opening 74 having a cylindrical wall 76 of a predetermined diameter. The assembly 70 further comprises a mount plate 78 having an annular boss 82 formed of wall 84. Load beam 73 is fixed to the mount plate base 75 by welding or the like. Boss 82 is greater in diameter than the circular opening 74. In addition, boss wall 84 has chamfered insertion shoulders 85 at its distal end 87, a feature equally applicable to the other embodiments herein. In addition, the boss wall 84 has at its distal end 87 an outwardly projecting annular shoulder 89 which can be a tapered portion of the boss 82, sized to further compress the slot 88 to an enhanced degree to be less than its initial width in the assembled condition of the actuator arm 72 and mounting plate 78 thereby to progressively increase by camming action the radial forces between the boss 82 and the arm opening 74. Split ring structure 86 is provided in the boss 82 as shown including the through slot 88 having opposing faces 88a, 88b, the slot being adapted to be compressed to a less than initial width by the entry of the boss 82 into the circular opening 74, effecting a contraction of the boss 82, Compare FIG. 5A with FIG. 5B.

In the foregoing embodiments, typically, the mounting plate is formed of full hard stainless steel having an Rc of 40–45, the through slot is about 0.005 inch in width and sufficiently deep to extend through the annular boss wall boss or the actuator circular opening wall, and the annular boss is chamfered about its outer upper edge to facilitate entry of the boss into the circular opening.

As previously noted, a typical assembly of the invention where the arm has the split ring structure will have a mounting plate base of about 0.2 inch square and about 0.010 inch or less deep and a central annular boss extending about 0.012 inch in height from the mounting plate base, the boss having an outside diameter of about 0.1075 inch. The actuator an arm will have a distal end with a thickness of about 0.03 inch, the actuator circular opening having an inside diameter of about 0.1050 inch and smaller than the boss outside diameter with the actuator opening extending through the arm distal end.

Also, in a given embodiment, the axis of revolution of the actuator circular opening wall will be located about 0.085 inch from the arm distal end.

A typical assembly where the boss has the split ring structure will include a mounting plate base of about 0.2 inch square and about 0.010 inch or less deep and a central annular boss comprising an annular wall extending about 0.012 inch in height from the mounting plate base, the boss having an outside diameter of about 0.1075 inch. The actuator arm will have a distal end with a thickness of about 0.03 inch, the actuator arm defining a wall surrounding the circular opening, the circular opening having an inside diameter of about 0.1050 inch and smaller than the boss outside diameter, the actuator opening extending through the arm distal end, with the through slot extending through the boss annular wall for substantially the height of the annular boss wall.

In practicing the invention method, the mounting plate having an annular boss and carrying a load beam in fixed relation is mounted to an actuator arm having a circular opening smaller than and congruent with the boss. A slot is defined having an original width in the annular boss or the circular opening boss, The annular boss is inserted into the circular opening, expanding or contracting the slot to accommodate the insertion step. The force generated by the slot tending to return to its original width maintains the annular boss within the circular opening effecting a fixing of the load beam to the actuator arm.

The invention thus provides an alternative method of HGA attachment to the actuator in the stack build using a mounting plate boss larger, not smaller, than the arm circular opening, and assembling the mounting plate and arm together not by swaging or staking, but by the use of a split ring structure. The split ring structure, incorporated into the annular boss or the boss-receiving arm opening allows the fitting of parts by expanding or contracting depending on whether the split ring is in the inside or outside component of the assembly, and preserves their angular orientation by resiliently urging the parts into engagement as a function of the split ring slot tending to return to its preassembly larger or smaller width. Insertion of the boss is facilitated by a chamfer on the boss, and the invention provides a camming shoulder on the boss to increase radial forces in the assembled device. The foregoing objects are thus met.

We claim:

1. An assembly comprising a mounting plate having an annular boss of a predetermined outside diameter, an actuator comprising an arm, said arm defining a wall surrounding a circular opening of a predetermined inside diameter smaller than said boss outside diameter, said wall having a through slot with its long axis perpendicular to the axis of revolution of said circular opening in said wall to facilitate expansion of said actuator circular opening to a diameter that fits over said boss to permit circular opening and boss interfittment, said mounting plate boss and said actuator opening being interfitted, and a load beam attached to said mounting plate between said mounting plate and said actuator in their interfitted condition.

2. The assembly according to claim 1 in which said mounting plate is formed of full hard stainless steel having an Rc of 40–45.

3. The assembly according to claim 1, in which said through slot is about 0.005 inch in width and sufficiently deep to extend through said actuator circular opening wall.

4. The assembly according to claim 1, in which said annular boss is chamfered about its outer upper edge to facilitate entry of said boss into said circular opening.

5. The assembly according to claim 1, in which said mounting plate has a base about 0.2 inch square and less than about 0.010 inch deep and a central annular boss extending about 0.012 inch in height from said mounting plate base, said boss having an outside diameter of about 0.1075 inch, said actuator arm having a distal end with a thickness of about 0.03 inch, said actuator circular opening having an inside diameter of about 0.1050 inch and smaller than said boss outside diameter, said actuator opening extending through said arm distal end, said through slot extending through said arm distal end between said actuator circular opening and said arm distal end and having a width of about 0.005 inch.

6. The assembly according to claim 5, in which said axis of revolution is located about 0.085 inch from said arm distal end.

7. The assembly according to claim 1, in which said mounting plate has a base about 0.2 inch square and less than about 0.010 inch deep and a central annular boss comprising an annular wall extending about 0.012 inch in height from said mounting plate base, said boss having an outside diameter of about 0.1075 inch, said actuator arm having a distal end with a thickness of about 0.03 inch, said circular opening having an inside diameter of about 0.1050 inch and smaller than said boss outside diameter, said actuator opening extending through said arm distal end, said through slot having a width of about 0.005 inch.

8. The assembly according to claim 7, in which said axis of revolution is located about 0.085 inch from said arm distal end.

9. The assembly according to claim 7, in which said boss annular wall is generally cylindrical and has a thickness of not less than about 0.020 inch.

10. The assembly according to claim 7, in which said slot has opposed faces spaced by said slot width, said boss annular wall having at its distal end an outwardly projecting shoulder sized to expand said slot to greater than its initial width in the assembled condition of said actuator and mounting plate thereby to increase the radial forces therebetween.

11. A disk drive suspension actuator arm and mounting plate assembly in which said mounting plate has an annular boss having a predetermined outside diameter and mounting a load beam and said actuator arm defines a wall surrounding a circular opening having a predetermined inside diameter smaller than said boss outside diameter, said annular boss diameter exceeding the actuator arm circular opening diameter, said wall having a through slot with its long axis perpendicular to the axis of revolution of said circular opening, whereby said circular opening defines a split ring structure enabling insertion of said annular boss into said circular opening and retention therein under compressive forces generated by said split ring structure.

* * * * *